(12) United States Patent
Albrecht

(10) Patent No.: US 6,354,011 B1
(45) Date of Patent: Mar. 12, 2002

(54) ORIENTATION MEASURING DEVICE

(75) Inventor: Christian Albrecht, Munich (DE)

(73) Assignee: Pruftechnik Dieter Busch AG, Munich (DE)

( * ) Notice: Subject to any disclaimer, the term of this patent is extended or adjusted under 35 U.S.C. 154(b) by 0 days.

(21) Appl. No.: 09/495,517

(22) Filed: Feb. 1, 2000

(51) Int. Cl.[7] .................. G01C 19/00; G01C 15/00; G01C 19/38; G01C 17/18
(52) U.S. Cl. .................. 33/318; 33/281; 33/286; 33/321; 33/324; 33/325; 33/347
(58) Field of Search .................. 33/272–273, 281–286, 33/316–321, 324–325, 347, 370, DIG. 1, 371–373

(56) References Cited

U.S. PATENT DOCUMENTS

| 3,695,554 A | * | 10/1972 | Phillips | 244/170 |
| 4,518,855 A | * | 5/1985 | Malak | 250/201 |
| 4,532,402 A | * | 7/1985 | Overbeck | 219/127.78 |
| 4,650,331 A | * | 3/1987 | Rodloff et al. | 356/350 |
| 4,882,845 A | * | 11/1989 | Boyer | 33/324 |
| 5,128,898 A | * | 7/1992 | Hill et al. | 33/309 |
| 5,262,777 A | * | 11/1993 | Low et al. | 341/204 |
| 5,375,336 A | * | 12/1994 | Nakamura | 33/324 |
| 5,408,751 A | * | 4/1995 | Rodloff et al. | 33/318 |
| 5,589,775 A | * | 12/1996 | Kuckes | 324/346 |
| 5,606,124 A | * | 2/1997 | Doyle et al. | 33/304 |
| 5,699,256 A | * | 12/1997 | Shibuya et al. | 33/318 |
| 5,778,543 A | * | 7/1998 | Schneider et al. | 33/324 |
| 5,966,680 A | * | 10/1999 | Butnaru | 702/150 |
| 5,982,487 A | * | 11/1999 | Schneider et al. | 33/324 |
| 6,162,191 A | * | 12/2000 | Foxlin | 600/595 |

FOREIGN PATENT DOCUMENTS

| JP | 10-160432 | 6/1998 |
| WO | WO 98/23447 | 6/1998 |

* cited by examiner

*Primary Examiner*—Diego Gutierrez
*Assistant Examiner*—Yaritza Guadalupe
(74) *Attorney, Agent, or Firm*—Nixon Peabody LLP; David S. Safran

(57) ABSTRACT

An orientation measuring device with a plurality of precision tooled grooves, indentations or the like. Two precision tooled adaptor bodies, preferably of cylindrical shape, are removably mountable in the indentations, where appropriate, for a given measuring task. The adaptor bodies are held in place by, e.g., magnets. The device is capable of determining the spatial orientation of rolls, bars, hollow or solid cylinders, ranging from small to large diameters by appropriately selecting in which of the grooves or indentations the adaptor bodies are mounted.

12 Claims, 1 Drawing Sheet

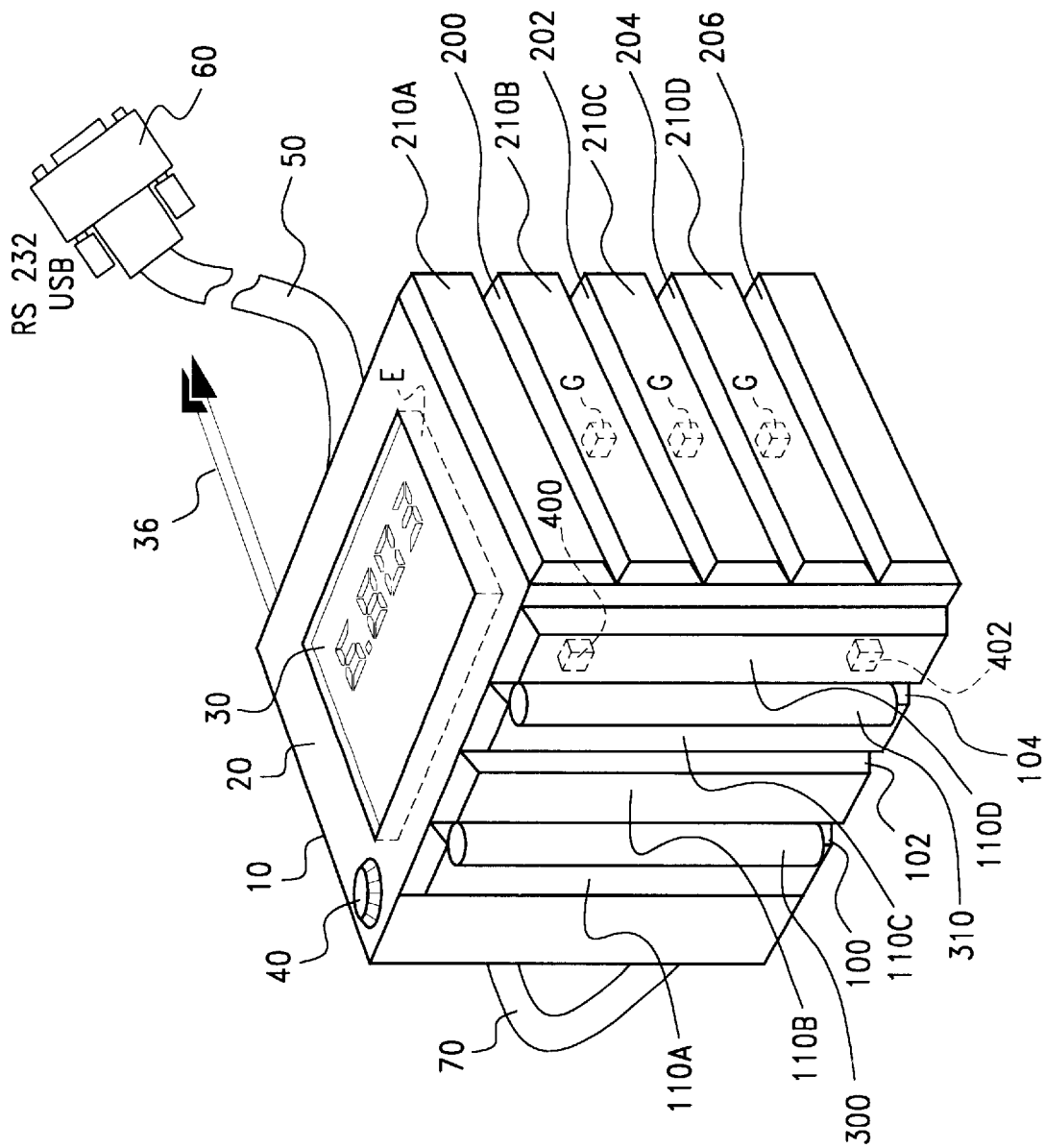

ORIENTATION MEASURING DEVICE

BACKGROUND OF THE INVENTION

1. Field of the Invention

The invention relates to an orientation measuring device for determining the spatial orientation of, for example, rolls, bars, hollow or solid cylinders, etc., ranging from small to large diameters.

2. Description of Related Art

As disclosed in commonly owned, co-pending U.S. patent application Ser. No. 09/077,887, based on published International Patent Application PCT/EP96/00623, an orientation measuring device of the type to which the present invention is directed is very useful for precisely determining an actual spatial orientation of a cylinder, or roll of a printing or paper making machine, or the like. The usefulness of such devices relates to the following: in order to align a plurality of such cylinders in parallel, use of a set of two spirit levels or the like will be insufficient; however, such levels cannot determine an angular orientation regarding a yaw direction. Due to the extremely high precision of laser optic gyroscopic orientation measuring devices, performing alignment of such cylinders can be performed with very high accuracy, and also in an astounding minimum of time, as compared to techniques formerly applied. In order to perform an alignment task on cylinders of the mentioned kind, according to former art, it is convenient to attach a precision tooled mechanical prism (of the concave type) to the orientation measuring devices. Using such a combination of instrument and prism, it is possible to perform a direction determining measurement by just contacting the prism to the cylindrical surface of the roll. However, this arrangement renders such devices useful for only a limited range of diameters of rolls to be checked or aligned.

SUMMARY OF THE INVENTION

Thus, the problem to be solved by the present invention is to create a device that will allow precise checking of the orientation of rolls, cylinders, hollow bores, and similar cylindrical objects, for a significantly enlarged range of diameters, as compared to the former state of the art.

This problem is solved, according to the present invention, by providing an orientation measuring device that comprises a plurality of orientation sensing means, at least one of which is a gyroscope (preferably a laseroptical gyroscope with an electronic output), a housing with side walls, preferably having a block shape with surfaces perpendicularly orientated towards each other which have at least three slots or indentations of precision tooled surface quality for receiving two adapting bodies, and precision tooled adapting bodies which are temporarily insertable into such slots or indentations, the adapting bodies preferably being of cylindrical shape.

Useful refinements of the invention include the adapting bodies having a polygonal cross section, the adapting bodies being removably fastened to the housing by permanent magnetic means, the housing being made from at least one of the group of stainless steels and glassy or ceramic substances having nearly zero coefficient of thermal expansion, examples of suitable glassy or ceramic substances being materials such as quartz glass, Ceran®, Zerodur®, Jena® glass, Pyrex® glass. Still further refinements include the housing of the orientation measuring device having at least one surface machined to be planar to a very high degree of precision, and/or is provided with at least one anchoring site for attaching a handle. Additionally, the orientation sensor according to the invention can be provided with an optical beam generating device capable of producing a light beam of essentially constant cross section, the direction of which light beam is parallel to two sides of the housing.

The invention is explained in more detail below with reference to the drawings which show one embodiment in accordance with the present invention.

BRIEF DESCRIPTION OF THE DRAWINGS

The sole FIGURE of the drawings is a perspective view of an orientation measuring device according to the present invention.

DETAILED DESCRIPTION OF THE INVENTION

The cubic or rectangularly shaped housing 10 of the device is useful for housing three laseroptical gyroscopes G of very high precision and resolution, plus attached electronics E to perform actual measurements of orientation, and to calculate pitch, yaw, and roll angles of orientation of the device, as is known from prior art. Instead of three laser optical gyroscopes a combination of two clinometers or inclinometers plus one laseroptical gyroscope may suffice as sensors, for less demanding tasks. Such sensors and electronics are only generically depicted in schematic form in phantom outline, their specific construction and location within the housing forming no part of the present invention.

Even though the gyroscopes will operate continuously, being powered from an internal or external power supply, e.g., batteries, measurements of interest may be recorded by pressing a button 40. Display 30, with its front surface positioned below the precision tooled top surface 20 of housing 10, may display a recorded value for some time and then resume continuous display of measured values of pitch, yaw or roll. Useful add-ons are a laser beam pointer 36 that points parallel to two of the surfaces of housing 10, or a computer input/output, preferably of the serial type, such as an RS 232 or USB type connector 60 coupled to the orientation measuring device via cable 50 as commonly found on personal computers. Another useful add-on is a handle 70, that may be detachably fastened or anchored at one of a plurality of predefined anchoring sites (not shown) provided with housing 10.

A most important aspect of the invention are sidewalls of the housing, that are preferred to (but do not necessarily have to) exhibit an very high degree of planarity, which are divided into segments 110A to 110D and 210A to 210D separated by grooves or indentations 100, 102, 104, 200, 202, 204, 206. The grooves or indentations 100, 102, 104, 200, 202, 204, 206 are of very high mechanical quality, i.e., machined to a predefined shape with extraordinarily tight tolerances, in the micrometer or submicrometer range. Thus, it is possible to attach device 10 with its segmented surfaces 110A to 110D, or 210A to 210D, to a planar surface that may serve as a reference. Attaching the instruments with three cornering surfaces to a rectangular corner, for referencing purposes, may be performed as well. In order to apply the invention and perform easy measurement with cylinders or the like, of different diameters, two adaptor bodies 300, 310 are inserted into two of the provided, selectable sites as predefined by the grooves or indentations 100, 102, 104, or 200 to 206, as shown. As stated already, the contacting surfaces of adaptor bodies 300, 310 are finished to the same quality and precision as those of the grooves or indentations 100, 102, 104, 200, 202, 204, 206. For practical purposes, this means that these surfaces are polished to a planarity of better than about one micrometer.

In order to keep mentioned adaptor bodies 300 and 310 in their selected sites, permanent magnets, such as magnets 400, 402, are buried under surfaces 110A to 110D, and attract a ferromagnetic part of the adaptor bodies 300, 310. While the surfaces of these adaptor bodies are preferred to be of cylindrical shape, they may have other cross sections. Furthermore, the adaptor bodies 300, 310 are made from stainless steel, or ceramics, or a glassy material, all of which tend to be non-ferromagnetic). Other methods of temporarily attaching the adaptor rods to the housing are also possible. According to the size of a cylinder to be measured, and its diameter, the operator of the orientation measuring device will select grooves (indentations) that are best suited for a current task, and will then insert the two adaptor bodies 300, 310 accordingly. That is, for cylinders of small diameter (inch to feet range), adjacent grooves or indentations, or spaced with a shorter distance, will be selected. In case where cylinders of large diameter (e.g., one to several yards or meters range) are to be checked or aligned, the operator will have to select two appropriate grooves (indentations) that are tooled into the same surface of the measuring device 10, but are spaced apart to a sufficient amount. For example, instead of using grooves 202 and 204, grooves 200 and 206 could be used in the latter case. It should be noted, that FIG. 1, for purposes of clarity, shows fewer indentations than would be provided with a manufactured instrument.

The invention is of specific value because, with just one type of adapting body, it now will be possible to use the same instrument for measuring cylinders having convex surfaces (e.g., rolls) as well as for measuring hollow cylinders having concave surfaces (e.g., inside of turbine housings, bores of large diameter, cylinders of large combustion engines, etc.).

I claim:

1. Orientation measuring device, comprising:
   a) a housing;
   b) a plurality of orientation sensors, at least one of which is a gyroscope, located in said housing;
   c) at least three precision tooled slots indentations in at least one outer surface of the housing for receiving at least two adapting bodies;
   d) at least two precision tooled adapting bodies which are mountable in said slots or indentations.

2. Orientation measuring device according to claim 1, wherein said at least two adapting bodies are tubular or cylindrical and are removably attached in said slots or indentations.

3. Orientation measuring device according to claim 1, where the adapting bodies have a polygonal cross section.

4. Orientation measuring device according to claim 1, wherein the adapting bodies are removably fastened to the housing by permanent magnets.

5. Orientation measuring device according to claim 1, wherein the housing is made of at least one material having a nearly zero coefficient of thermal expansion selected from the group consisting of stainless steels and glassy or ceramic substances.

6. Orientation measuring device according to claim 5, wherein the glassy or ceramic substances is selected from the group consisting of quartz glass, Ceran®, Zerodur®, Jena® glass, and Pyrex® glass.

7. Orientation measuring device according to claim 1, wherein the housing has at least one planar surface plane that has been machined to a very high degree of precision.

8. Orientation measuring device according to claim 7, wherein said very high degree of precision is in a micron range or less.

9. Orientation measuring device according to claim 7, wherein said precision tooling is in a tolerance range of a micron or less.

10. Orientation measuring device according to claim 1, wherein the housing is provided with at least one anchoring site for attaching of a handle.

11. Orientation sensor according to claim 1, further comprising an optical beam generating device capable of producing a light beam of essentially constant cross section, said optical beam generating device being mounted to the housing so that the light beam produced thereby is parallel to two sides of the housing.

12. Orientation sensor according to claim 1, further comprising measurement electronic connected to said sensors and a computer input/output cable for connection of the measurement electronics with a separate external computer.

* * * * *